May 20, 1958
W. E. CLINE ET AL
PROCESS FOR GRANULATING UREA-FORMALDEHYDE FERTILIZER COMPOSITIONS
Filed June 28, 1954
2,835,452
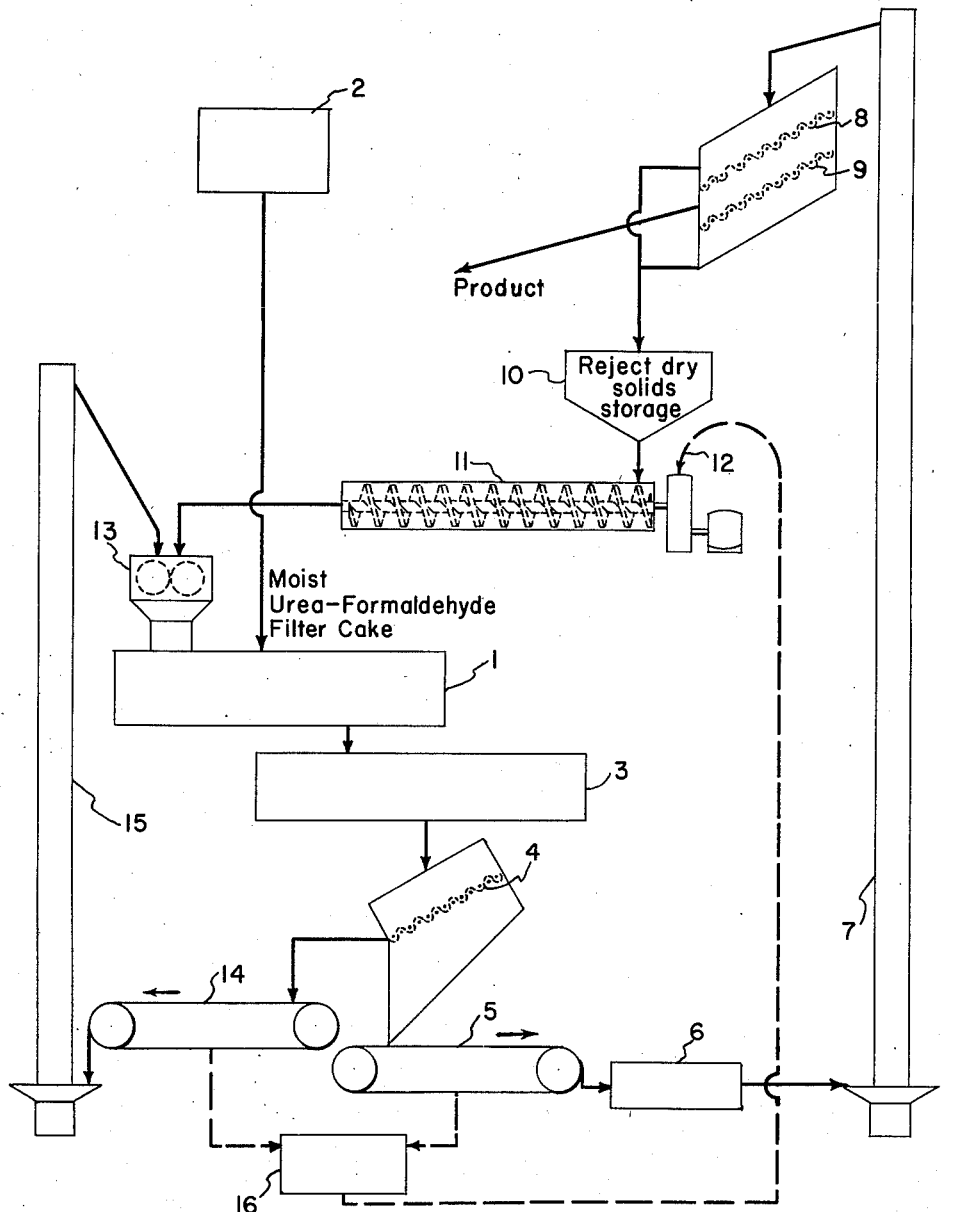
INVENTORS
WILLIAM EDWARD CLINE
MERTON MILES DeLANCEY
DONALD ALLEN ENGELBRECHT
BY
*A. McAlevy*
ATTORNEY

United States Patent Office 2,835,452
Patented May 20, 1958

2,835,452
PROCESS FOR GRANULATING UREA-FORMAL-DEHYDE FERTILIZER COMPOSITIONS

William Edward Cline, Merton Miles De Lancey, and Donald Allen Engelbrecht, Charleston, W. Va., assignors to E. I. du Pont de Nemours and Company, Wilmington, Del., a corporation of Delaware Application June 28, 1954, Serial No. 439,596

3 Claims. (Cl. 241—23)

This invention relates to a novel process for granulating solids, particularly urea-formaldehyde fertilizer compositions. It also relates to a novel method and also a novel apparatus for controlling granule size, which method and apparatus can be employed in the manufacture of the said granular fertilizer compositions.

Heretofore in the manufacture of granulated solids it has been conventional to control granulation by controlling the quantity of liquid in the granulation equipment while also controlling other conditions which prevail during the granulation process, so as to maintain such conditions constant. It has been known that crystal or granule size can thus be maintained fairly uniform by maintaining quantitative control over the relative amount of liquid, as well as degree of agitation, etc. In such processes, weigh belts have been employed to control the rate of feed of moist solid to the granulating vessel while at the same time controlling the rate of feed of liquid phase, so as to maintain the conditions relatively constant and thereby produce a relatively constant granular product. Mechanisms have been devised for varying the rate of feed of one material to maintain a constant ratio between a plurality of feed sources (cf. U. S. 2,289,186, issued to James A. Flint, July 7, 1942).

While the aforesaid processes have been entirely satisfactory for the preparation of granular materials where the amounts of solid ingredients and liquid ingredients to be subjected to granulation can be held relatively constant, these processes are not suitable where the material to be granulated is a filter-cake which can vary with respect to solids content and moisture content, and also with respect to the ease of nodulization.

An object of this invention is to provide a process for production of granular solid materials particularly urea-formaldehyde fertilizer compositions from a source of solid and liquid components which varies both with respect to the rate of feed of solid components and the proportion of liquid component therein. Other objects of the invention will appear hereinafter.

The present invention provides a method whereby solid materials which are to be subjected to a granulation process can be fed into a granulation vessel at rates which are determined and controlled by the size distribution of the products obtained from the said granulation vessel. In the process of this invention the granulation conditions are controlled not by the moisture content of the moist solids which are fed to the granulator but by the relative amounts of the oversize and undersize particles which are produced by passing the granulated product through suitable screens thence onto weigh belts which in particular embodiments move at speeds determined by the relative weights of granules carried, i. e. the respective weights, per unit time, of the ranges of sizes separated by means of the said screens. If the quantity of large-sized granules is excessive, this indicates the existence of conditions which can be corrected by increasing rate of recycling of dry fines to the granulator, along with the moist filter-cake. This control over the rate of recycle of dry fines depends upon screens and weigh belts which respectively separate and measure the quantities of the oversize and undersize granules, produced by the granulator.

More particularly, in the process of this invention, impulses from the said weigh belts control the rate of recycle of dry fines as described in the accompanying drawing.

The figure of the drawing represents an arrangement of equipment including a granulating and mixing mill 1 (which may be of the general type of apparatus described in U. S. Patent 851,607, issued to Francis I. du Pont, April 23, 1907) into which is fed filter cake from the filters 2. The moist mixture which is withdrawn from the mill 1 is conducted through a second granulating mill 3 which produces granules of various sizes. Any other conventional granulating means may be used instead of the mills 1 and 3. Suitable devices include paddle mixers, cascading type mixers, etc. The granules thus formed are conducted to the screen 4 which may suitably be of six mesh but may be of any other convenient size. The fines from the screen 4 continuously collect upon the weigh belt 5 which conducts the fines to the dryer 6. The dry product obtained from the dryer 6 is sent by means of an elevator 7 to the screens 8 and 9 which are suitably of 10 and 20 mesh respectively (but which may be of other sizes if desired), the oversize and undersize particles being collected in the bin 10. Dry solids from the bin are conducted to the screw conveyor 11 which is equipped with a variable speed control 12. This conveyor feeds the crusher 13, which feeds the granulating-mixing mill 1. The coarse product which fails to pass through the screen 4 is transferred by means of the weigh belt 14 to the elevator 15, and thence to the crusher 13. The weigh belts 5 and 14 control the electrical switch 16 which in turn controls the variable speed control 12 in such a way that if the product from the granulating mill 3 contains particles which are too high in moisture content and hence are made up largely of relatively large particles, the feed of dry solid will be increased by means of the variable control 12. The switch 16, as indicated in the drawing, is controlled by the respective loads carried by the moving weigh belts. This control is exerted in such fashion that if the load on 14 is in excess of the predetermined standard, the switch is engaged and the circuit, which actuates the motor driving the mechanism 12, is actuated. Since this predetermined standard is dependent upon the load on 5, the effect is to control the recycling of dried solids by increasing the rate of said recycling when the load on 14 relative to the load on 5 becomes excessive. The net result of these operations is to control the respective feeds to the granulating-mixing mill 1 in such a manner as to produce a maximum amount of product of desired range of grain size from between screens 8 and 9.

The invention is illustrated further by means of the following examples.

*Example 1.*—In a plant in the nature of that illustrated in the above-described drawing a filter-cake containing 48% water and 52% of urea-formaldehyde having a total urea:formaldehyde mol ratio of 1.5:1 is fed into a mill (having two sets of paddles, one moving clockwise and the other counter clockwise) together with dry solid as hereinafter described. The recycled solids include material which is both oversized and undersized with reference to the desired size of particles in the final product (about 6 to 20 mesh) has a moisture content of about 2%. The said mill contains shafts which rotate at the rate of about 50 R. P. M. in opposite directions and the vanes or paddles therein move through a diameter of about 21 inches. The product withdrawn from the said mill is passed to a second and similar mill (serving as a granulator) which operates at the rate of about 100 R. P. M. The product withdrawn from the second mill is screened by means of a 6 mesh screen and the oversized particles are conducted by means of a weigh belt to the crusher as explained in the description hereinabove given. The product which passes through the screen is conducted by means of another weigh belt to a dryer (operated at an inlet air temperature of 300° C., exit air temperature being 100° C.), and thence to screens which have respectively 10 and 20 mesh sized openings. The desired product is the material which passes through the 10 mesh screen but not through the 20 mesh screen. The oversized and undersized particles from these screens are conducted to the screw conveyor as shown in the drawing and the rate of feed from the screw conveyor is controlled as above described by means of the impulses of the weigh belts. Each weigh belt is operated at a rate determined by the load carried thereby. The passage of the product through the 6 mesh screen separates the granules amounting to 10–20% of the total (other suitable proportions can of course be used). This percentage range varies with the ease of nodulization of the filter-cake. When this ease of nodulization is constant, this percentage is kept constant by means of the control on the screw conveyor and the ratio controller which is operated by the said weigh belts. In either event, a product of uniform quality and character is obtained, without loss of any product, and with a minimum of solids recycling.

The invention is especially valuable in the production of urea-formaldehyde fertilizers from the precipitates or slurries obtained by reaction of urea with aqueous formaldehyde. The wet mass of solids, or filter-cake, in such processes has a urea:formaldehyde mol ratio of 1.4:1 to 1.6:1, and there is preferably a somewhat higher mol ratio of urea:formaldehyde in the mother liquid (namely about 1.7:1 to 1.9:1), from which the slurry or filter-cake has been separated. The pH of such mixtures is generally about 8 at the time of separation of the filter-cake or slurry.

The present invention, it is to be understood, is directed especially to the method of handling the filter-cake or similar moist solid, rather than to the specific details in the preparation thereof. In fact the details of the said preparation, which have an important bearing on the nitrogen availability of the fertilizer product, have relatively little influence on the granulation step, which is the same for products of low or high nitrogen availability index. However, control of granule size is of great consequence in fertilizer manufacture, both because of the desirability for avoiding undue waste of fertilizer in the form of dust, and because the rate of solution of slowly soluble ingredients depends in part on granule size.

While in the foregoing illustration the weigh belts 5 and 14 are shown as operating at speeds which are determined by the weight of material carried thereby, it is to be understood that this is not essential since the weigh belts may each operate at constant speed, and carry variable loads determined solely by the respective rates of delivery of wet coarse solid and wet fine solid, to said belts.

While the method and apparatus of this invention has been described with particular reference to moist urea-formaldehyde feeds, it is to be understood that it is applicable to other feed stocks, especially those in which the range of granule size is determined by the moisture content of the solids undergoing granulation, said granules being capable of separation by screening. Granules which contain resin which advances to a further stage of polymerization are especially suitable, since such granules are not unduly frangible during drying.

What is claimed is the following:

1. In a process for converting moist urea-formaldehyde to dried particles of a desired range of granule size the steps which comprise agitating, in a granulating means, moist urea-formaldehyde to produce granulation thereof, screening the resultant moist granular product, continuously forwarding the moist fines produced by the said screening to a drier by means of a weigh belt, drying the said fines in the said drier, continuously forwarding all of the moist coarse granules produced by said screening, by means of another weigh belt, to a crusher supplying additional moist solid to the said granulating means, while recycling a part of the said dried fines to the said granulating means, said recycled part being obtained by screening the dried fines to separate therefrom particles of the desired range of size and recycling the oversize and undersize dried fines, the rate of feeding said dried fines to the granulating means being controlled directly by the ratio of weight per unit time of material carried by the weigh belt for the said moist coarse granules, to the weight per unit time of material carried by the weigh belt for the moist fines.

2. Process of claim 1 wherein the recycle of the said dried fines to the granulation vessel is accomplished by admixing the recycled part of the dried fines with the said moist coarse granules in a crusher which in turn feeds a granulator-mixer which in turn feeds a second granulation vessel.

3. Process of claim 2 wherein the moist urea-formaldehyde has a urea:formaldehyde mol ratio of 1.4:1 to 1.6:1.

References Cited in the file of this patent

UNITED STATES PATENTS

| | | |
|---|---|---|
| 2,132,656 | Smith | Oct. 11, 1938 |
| 2,205,177 | Schlegel | June 18, 1940 |
| 2,461,089 | Smidth | Feb. 8, 1949 |